(12) United States Patent
Kilbourne, II et al.

(10) Patent No.: US 7,895,286 B1
(45) Date of Patent: Feb. 22, 2011

(54) NETWORK STORAGE SYSTEM WITH NVRAM AND CLUSTER INTERCONNECT ADAPTER IMPLEMENTED IN A SINGLE CIRCUIT MODULE

(75) Inventors: Allen J. Kilbourne, II, Tracy, CA (US); Steven J. Valin, Nevada City, CA (US); Ravi K. Budhia, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1342 days.

(21) Appl. No.: 10/836,980

(22) Filed: Apr. 30, 2004

(51) Int. Cl.
*G06F 15/167* (2006.01)
*G06F 15/16* (2006.01)

(52) U.S. Cl. ...................... 709/212; 709/250

(58) Field of Classification Search .................. None
See application file for complete search history.

(56) References Cited

U.S. PATENT DOCUMENTS

| | | | |
|---|---|---|---|
| 5,991,797 A | | 11/1999 | Futral et al. |
| 6,085,278 A | | 7/2000 | Gates et al. |
| 6,138,250 A | * | 10/2000 | Nouri et al. ............... 714/31 |
| 6,301,605 B1 | | 10/2001 | Napolitano et al. |
| 6,467,022 B1 | | 10/2002 | Buckland et al. |
| 6,530,003 B2 | | 3/2003 | Bakke et al. |
| 6,594,712 B1 | | 7/2003 | Pettey et al. |
| 6,675,200 B1 | | 1/2004 | Cheriton et al. |
| 6,704,831 B1 | | 3/2004 | Avery |
| 6,928,478 B1 | | 8/2005 | Gangadharan |
| 6,957,312 B1 | | 10/2005 | Chou et al. |
| 7,007,142 B2 | * | 2/2006 | Smith ..................... 711/162 |
| 7,152,122 B2 | | 12/2006 | Kagan et al. |
| 7,159,111 B1 | | 1/2007 | Ganapathy |
| 7,165,110 B2 | | 1/2007 | Neal et al. |
| 7,231,444 B1 | | 6/2007 | Chou et al. |
| 7,266,614 B1 | | 9/2007 | Winkles et al. |
| 7,493,424 B1 | | 2/2009 | Bali et al. |
| 7,539,781 B1 | | 5/2009 | Bali et al. |
| 7,769,913 B1 | | 8/2010 | Budhla et al. |
| 2002/0150106 A1 | | 10/2002 | Kagan et al. |
| 2003/0023896 A1 | | 1/2003 | Kashyap |
| 2003/0033426 A1 | | 2/2003 | Beukema et al. |
| 2003/0051014 A1 | | 3/2003 | Gluska et al. |
| 2003/0103455 A1 | | 6/2003 | Pinto |
| 2003/0115447 A1 | | 6/2003 | Pham et al. |
| 2003/0126343 A1 | | 7/2003 | Olarig et al. |
| 2003/0182502 A1 | | 9/2003 | Kleiman et al. |

(Continued)

OTHER PUBLICATIONS

Risi et al., "Understanding InfiniBand", Nov. 2002, Emerging Technology, pp. 125-128.*

(Continued)

*Primary Examiner*—Hassan Phillips
(74) *Attorney, Agent, or Firm*—Perkins Coie LLP

(57) ABSTRACT

A network storage system includes a non-volatile memory to store data including a log of received data access requests, and a cluster interconnect adapter through which to send data to a cluster partner. The nonvolatile memory and the cluster interconnect adapter are implemented in a single device connected to an expansion bus in the network storage system. Communication with the nonvolatile memory is carried out using LDMA, and communication with the cluster partner is carried out using RDMA via the cluster interconnect adapter. LDMA and RDMA functionality are merged in a common software stack.

22 Claims, 11 Drawing Sheets

U.S. PATENT DOCUMENTS

| | | | |
|---|---|---|---|
| 2003/0188229 A1* | 10/2003 | Lubbers et al. | 714/47 |
| 2003/0200315 A1 | 10/2003 | Goldenberg et al. | |
| 2004/0024962 A1 | 2/2004 | Chatterjee et al. | |
| 2004/0064590 A1 | 4/2004 | Starr et al. | |
| 2004/0073831 A1* | 4/2004 | Yanai et al. | 714/7 |
| 2004/0117438 A1 | 6/2004 | Considine et al. | |
| 2004/0128398 A1* | 7/2004 | Pettey | 709/249 |
| 2004/0268177 A1 | 12/2004 | Ji et al. | |
| 2005/0015459 A1* | 1/2005 | Gole et al. | 709/212 |
| 2005/0015460 A1 | 1/2005 | Gole et al. | |
| 2005/0027801 A1 | 2/2005 | Kashyap et al. | |
| 2005/0055479 A1* | 3/2005 | Zer et al. | 710/22 |
| 2005/0240942 A1 | 10/2005 | Hampton et al. | |
| 2005/0246393 A1 | 11/2005 | Coates et al. | |

OTHER PUBLICATIONS

Callaghan, Brent, et al., "NFS over RDMA", Sun Microsystems, Inc., SIGCOMM 2003, NICELI Workshop, pp. 1-17, downloaded on Apr. 23, 2004 from: http://www.acm.org/sigcomm/sigcomm2003/workshop/niceli/presentations/nfsrdma-slides.pdf.

InfiniBand™ Architecture Specification vol. 1, Release 1.1, Nov. 6, 2002, copyright © 1999, 2001, 2002 by InfiniBand[SM] Trade Association, pp. 2, 77, 86, 87, 91, 101, 102, 118, 119, 170, 171, 172, 443, 444, 544, 545, 546, 571, 617, 634, 706, 707, 708.

InfiniBand Architecture Specification vol. 1, 1990, InfiniBand Trade Association, Release 1.1, pp. 85-90, 102-105, 125-129, 705-709.

Stalings, W., "Operating Systems: Internals and Design Principles", Prentice-Hall, Inc., Fourth Edition, pps. 154-158, 2001.

Co-pending U.S. Appl. No. 10/837,139, filed Apr. 30, 2004.

Co-pending U.S. Appl. No. 10/837,435, filed Apr. 30, 2004.

Co-pending U.S. Appl. No. 10/837,149, filed Apr. 30, 2004.

Co-pending U.S. Appl. No. 10/837,553, filed Apr. 30, 2004.

Non-Final Office Action Mailed Sep. 1, 2009 in Co-pending U.S. Appl. No. 10/837,139, filed Apr. 30, 2004.

Non-Final Office Action Mailed Feb. 25, 2009 in Co-pending U.S. Appl. No. 10/837,139, filed Apr. 30, 2004.

Final Office Action Mailed Aug. 11, 2008 in Co-pending U.S. Appl. No. 10/837,139, filed Apr. 30, 2004.

Non-Final Office Action Mailed Nov. 26, 2007 in Co-pending U.S. Appl. No. 10/837,139, filed Apr. 30, 2004.

Final Office Action Mailed Jul. 13, 2007 in Co-pending U.S. Appl. No. 10/837,139, filed Apr. 30, 2004.

Non-Final Office Action Mailed Dec. 29, 2006 in Co-pending U.S. Appl. No. 10/837,139, filed Apr. 30, 2004.

Notice of Allowance Mailed Nov. 14, 2008 in Co-pending U.S. Appl. No. 10/837,435, filed Apr. 30, 2004.

Final Office Action Mailed Apr. 23, 2008 in Co-pending U.S. Appl. No. 10/837,435, filed Apr. 30, 2004.

Non-Final Office Action Mailed Sep. 27, 2007 in Co-pending U.S. Appl. No. 10/837,435, filed Apr. 30, 2004.

Non-Final Office Action Mailed Feb. 5, 2010 in Co-pending U.S. Appl. No. 10/837,149, filed Apr. 30, 2004.

Final Office Action Mailed Oct. 5, 2009 in Co-pending U.S. Appl. No. 10/837,149, filed Apr. 30, 2004.

Non-Final Office Action Mailed Mar. 4, 2009 in Co-pending U.S. Appl. No. 10/837,149, filed Apr. 30, 2004.

Final Office Action Mailed Nov. 13, 2008 in Co-pending U.S. Appl. No. 10/837,149, filed Apr. 30, 2004.

Non-Final Office Action Mailed Apr. 15, 2008 in Co-pending U.S. Appl. No. 10/837,149, filed Apr. 30, 2004.

Non-Final Office Action Mailed Dec. 18, 2007 in Co-pending U.S. Appl. No. 10/837,553, filed Apr. 30, 2004.

Final Office Action Mailed Jun. 16, 2008 in Co-pending U.S. Appl. No. 10/837,553, filed Apr. 30, 2004.

Non-Final Office Action Mailed Nov. 4, 2008 in Co-pending U.S. Appl. No. 10/837,553, filed Apr. 30, 2004.

Notice of Allowance Mailed Apr. 9, 2009 in Co-pending U.S. Appl. No. 10/837,553, filed Apr. 30, 2004.

Notice of Allowance Mailed Mar. 23, 2010 in Co-Pending U.S. Appl. No. 10/837,139, filed Apr. 30, 2004.

Final Office Action Mailed Jul. 22, 2010 in Co-pending U.S. Appl. No. 10/837,149, filed Apr. 30, 2004.

U.S. Appl. No. 10/837,139, filed Apr. 30, 2004 Inventor: Budhia, et al. Method and Apparatus for Assigning a Local Identifier to a Cluster Interconnect Port in a Network Port in a Network Storage System.

U.S. Appl. No. 10/837,149, filed Apr. 30, 2004 Inventor: Budhia, et al. Multicasting Message in a Network Storage System to Local NVRAM and Remote Cluster Partner.

* cited by examiner

NETWORK STORAGE SYSTEM WITH NVRAM AND CLUSTER INTERCONNECT ADAPTER IMPLEMENTED IN A SINGLE CIRCUIT MODULE

FIELD OF THE INVENTION

At least one embodiment of the present invention pertains to network storage systems for clustered failover (CFO) applications, and more particularly, to a network storage system with local and remote storage operations controlled by the same stack.

BACKGROUND

In modern computer networks, a storage server can be used for many different purposes, such as to provide multiple users with access to shared data or to back up mission critical data. A file server is an example of a storage server which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID).

One mode in which a file server can be used is a network attached storage (NAS) mode. In a NAS mode, a file server can be implemented in the form of an appliance, called a filer, that attaches to a network, such as a local area network (LAN) or a corporate intranet. An example of such an appliance is any of the Filer products made by Network Appliance, Inc. in Sunnyvale, Calif. A storage server can also be employed in a storage area network (SAN), which is a highly efficient network of interconnected, shared storage devices. In a SAN, the storage server (which may be an appliance) provides a remote host with block-level access to stored data, whereas in a NAS configuration, the storage server provides clients with file-level access to stored data.

Some storage servers, such as certain Filers from Network Appliance, Inc. are capable of operating in either a NAS mode or a SAN mode, or even both modes at the same time. Such dual-use devices are sometimes referred to as "unified storage" devices. A storage server such as this may use any of various protocols to store and provide data, such as Hypertext Transport Protocol (HTTP), Network File System (NFS), Common Internet File system (CIFS), Internet SCSI (ISCSI), and/or Fibre Channel Protocol (FCP).

A storage server such as a filer can be used to backup critical data, among other purposes. A data backup technique known as "mirroring" involves backing up data stored at a primary site by storing an exact duplicate (a mirror image) of the data at a remote secondary site. If data is ever lost at the primary site, it can be recovered from the secondary site.

A simple example of a network configuration for mirroring is illustrated in FIG. 1. A source filer 2A located at the primary site is coupled locally to a set of mass storage devices 4; to a set of clients 1 through a network 3, such as a local area network (LAN); and to a destination filer 2B located at a remote mirror site. Each of the clients 1 may be, for example, a conventional personal computer (PC), workstation, or the like. The destination filer 2B located at the mirror site is coupled locally to a separate set of mass storage devices 4 at the mirror site. The mass storage devices 4 may be, for example, conventional magnetic disks, optical disks such as CD-ROM or DVD based storage, magneto-optical (MO) storage, or any other type of non-volatile storage devices suitable for storing large quantities of data.

The source filer 2A receives and responds to various read and write requests from the clients 1. In a system which handles large volumes of client requests, it may be impractical to save data modifications to the mass storage devices 4 every time a write request is received from a client 1. The reason is that disk accesses tend to take a relatively long time compared to other operations. Therefore, the source filer 2A may instead hold write requests in memory temporarily and only periodically save the modified data to the mass storage devices 4, such as every few seconds. The event of saving the modified data to the mass storage devices is called a "consistency point". At a consistency point, the source filer 2A saves any data that was modified by the write requests to its local mass storage devices 4 and triggers a process of updating the data stored at the mirror site to reflect the updated primary volume.

In this approach, there is a small risk of a system failure occurring between consistency points, causing the loss of data modified after the last consistency point. Consequently, in at least one prior art solution, the source filer 2A includes a non-volatile random access memory (NVRAM) in which it maintains a log of write requests received from clients since the last consistency point. This log is referred to as the "NVLog". The NVLog includes a separate entry for each write request received from a client 1 since the last consistency point. Each NVLog entry includes the data to be written according to the corresponding request. The NVLog is only used in the event of a failure, to recover data that would otherwise be lost. In the event of a failure, it may be possible to replay the NVLog to reconstruct the current state of stored data just prior to the failure. After each consistency point is completed, the NVLog is cleared and started anew.

To protect against a failure of the source filer 2A (including its NVLog), an approach called clustered failover (CFO) has been used in the prior art, in which the source filer 2A and the destination filer 2B operate as "cluster partners". The example of FIG. 1 shows two filers 2A and 2B connected to each other and to each others mass storage devices 4, for CFO. As shown, the source filer 2A and destination filer 2B are connected by a high-speed cluster interconnect 5. The cluster interconnect can be implemented as, for example, one or more direct copper links, or as a Fibre Channel arbitration loop (FCAL).

In addition to the NVLog in the source filer 2A, a separate copy of the NVLog is maintained in a corresponding NVRAM in its cluster partner, destination filer 2B. In some implementations the NVLog in the destination filer 2B is created by sending each NVLog entry from the source filer 2A to the destination filer 2B at the time the entry is created (i.e., in response to a request). Upon receiving each NVLog entry from the source filer 2A, the destination filer 2B creates a corresponding NVLog entry in its own NVRAM. If one filer 2 fails, the other filer takes over the ownership of the failed filer's disks and replays the NVLog contents mirrored from the failed filer.

Each filer 2 has a remote direct memory access (RDMA) capability by which it can communicate over the cluster interconnect 5. This configuration enables replication of the source filer's NVLog on the destination filer 2B. The cluster interconnect 5 can also be used for non-DMA based communications, such as send/receive operations.

FIG. 2 is a block diagram showing the architecture of a filer 2 known in the prior art, representing either the source filer 2A or the destination filer 2B. The filer 2 includes one or more processors 21 and a system memory 22 coupled to each other by a north bridge. The north bridge 28 is also coupled to a Peripheral Component Interconnect (PCI) bus 23. The north bridge 28 provides an interface between peripheral components on the PCI bus and the processors 21 and system memory 22.

Each processor 21 is a central processing unit of (CPU) of the filer 2 and, thus, controls the overall operation of the filer 2. In certain embodiments, a processor 21 accomplishes this by executing software stored in system memory 22. Such software may include the operating system 24 of the filer 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 22 is a random access memory (RAM) which stores, among other things, the operating system 24 of the filer 2, in which the techniques introduced herein can be implemented.

Connected to the PCI bus 23 are an NVRAM 29, which stores the NVLog of the filer 2; one or more internal mass storage devices 25; a storage adapter 26; a network adapter 27; and a cluster interconnect adapter 30. Internal mass storage devices 25 may be or include any conventional medium for storing large volumes of data in a non-volatile manner, such as one or more disks. The storage adapter 26 allows the filer 2 to access the external mass storage devices 4 and may be, for example, a Fibre Channel adapter or a SCSI adapter. The network adapter 27 provides the filer 2 with the ability to communicate with remote devices such as the clients 1 over a network and may be, for example, an Ethernet adapter. The cluster interconnect adapter 30 provides the filer 2 with the ability to communicate with its cluster partner. In certain known implementations, the cluster interconnect adapter 30 complies with the InfiniBand Architecture Specification, Release 1.1, Nov. 6, 2002, to communicate with the cluster partner, and more specifically, to communicate with the cluster partner using RDMA or InfiniBand Send/Receive operations.

In accordance with one implementation known in the prior art, the filer 2 uses two independent drivers (driver software) to operate the NVRAM 29 and cluster interconnect hardware 30, with two separate software stacks for dealing with these two separate types of data transfers. Specifically, the NVRAM 29 and its corresponding driver software handle local DMA (LDMA) of data from system memory 22 into NVRAM 29, and the cluster interconnect adapter 30 and its separate driver software handle RDMA of data to the cluster partner's NVRAM.

One problem with clusters such as this is that sending data to NVRAM and to the cluster partner requires at least two PCI bus transactions. When a filer 2 receives a write request from a client 1, that request is first stored in system memory 22. A first PCI transaction is required to log the request in NVRAM 29. A second PCI transaction is required to send the request from NVRAM 29 (or to send it again from system memory 22) to the cluster interconnect adapter 30, for purposes of transmission to the cluster partner. The PCI bus 23, therefore, becomes the performance bottleneck in these clusters. PCI bus contention particularly tends to create a problem for sequential writes, which is one of the most challenging workloads for filer clusters.

A common way of measuring how well a filer cluster performs is to compare the cluster's performance with the performance of a single (non-clustered) filer. A cluster's performance may be expressed in the form of "nx", where n is called the cluster scaling factor. A two-filer cluster where the filers suffer no performance degradation due to clustering has a cluster scaling of 2x. A two-filer cluster where each node suffers a 25% performance degradation due to clustering has a scaling of 1.5x. Traditional clusters tend to be limited in performance due to PCI bus contention, which often results in a cluster scaling well below 2x for FCP sequential write workload in two-filer clusters.

Prior approaches to this problem involved introducing batching algorithms to reduce the number of interconnect operations and implementing faster interconnects. While these approaches improve performance to some extent, they do not address the underlying fundamental performance problem in many clusters, which is PCI bus contention.

SUMMARY OF THE INVENTION

The present invention includes a circuit module for use in a network storage system, and a network storage system including such a circuit module, where the circuit module includes a non-volatile memory to store log data representing data access requests received by the network storage system, and a cluster interconnect adapter through which to send the log data to a cluster partner of the network storage system.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A network storage system with NVRAM and cluster interconnect adapter implemented in a single circuit module is described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Overview

Introduced herein is a network storage system, such as a filer, in which an NVRAM and cluster interconnect adapter are combined into a single device that connects to a PCI bus (or other expansion bus) within the network storage system. Software for LDMA (for local NVRAM) and remote communication (such as RDMA) are merged into one software stack, such that a single driver is used to control both functions. This approach is advantageous, in that it requires only a single PCI transaction to transfer data from system memory to both local NVRAM and the remote cluster partner's NVRAM, thus alleviating a PCI bottleneck and improving cluster performance.

Note that to facilitate description, the techniques introduced herein are described as being implemented in a filer. It is to be understood, however, that these techniques can alternatively be implemented in other types of storage devices, such as storage servers which use purely block-based storage (e.g., for SAN), unified storage devices, etc.

Overall Architecture

Figure 1:
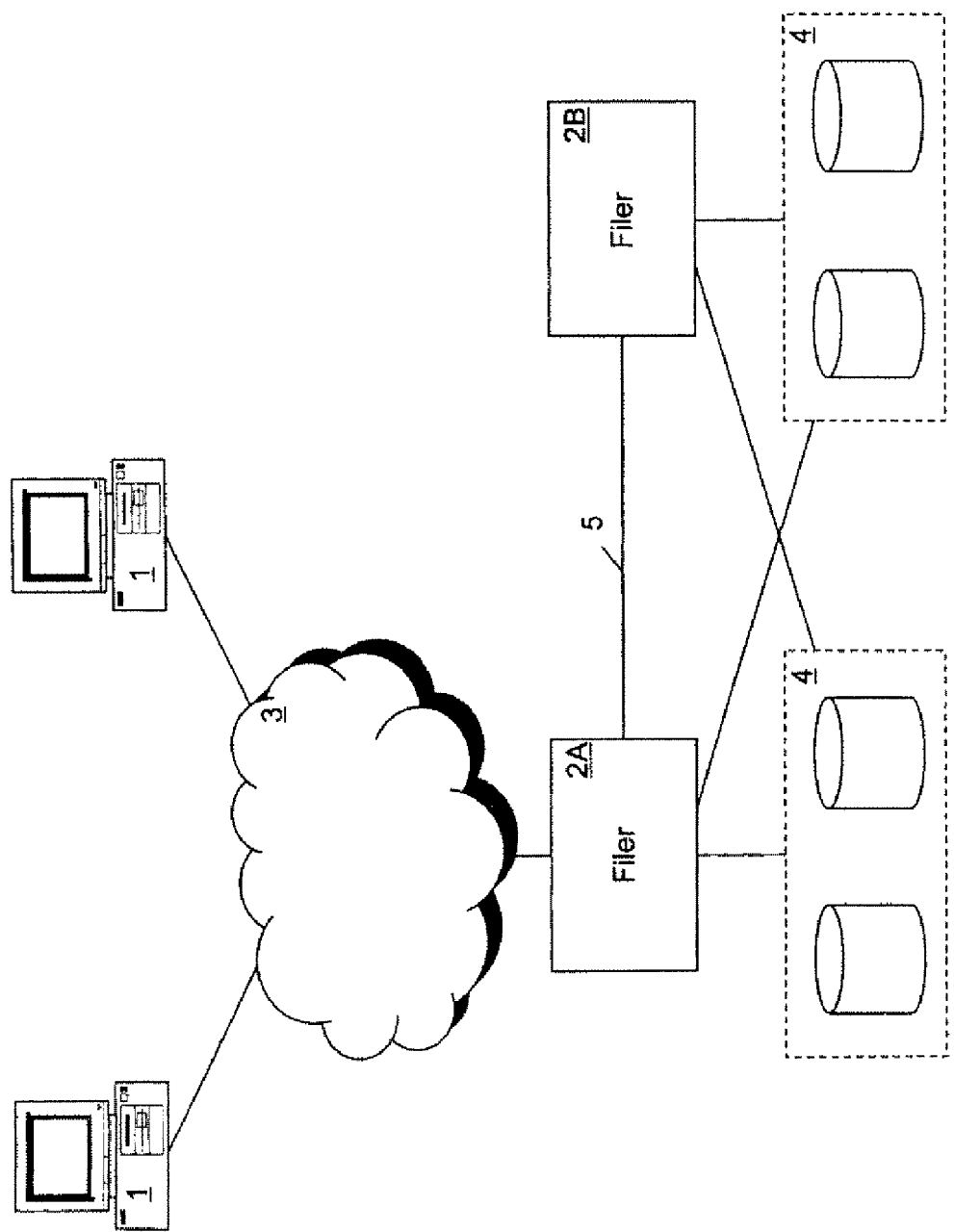
FIG. 1 illustrates a network configuration that includes two filers connected as a cluster-failover pair in the prior art.
Figure 2:
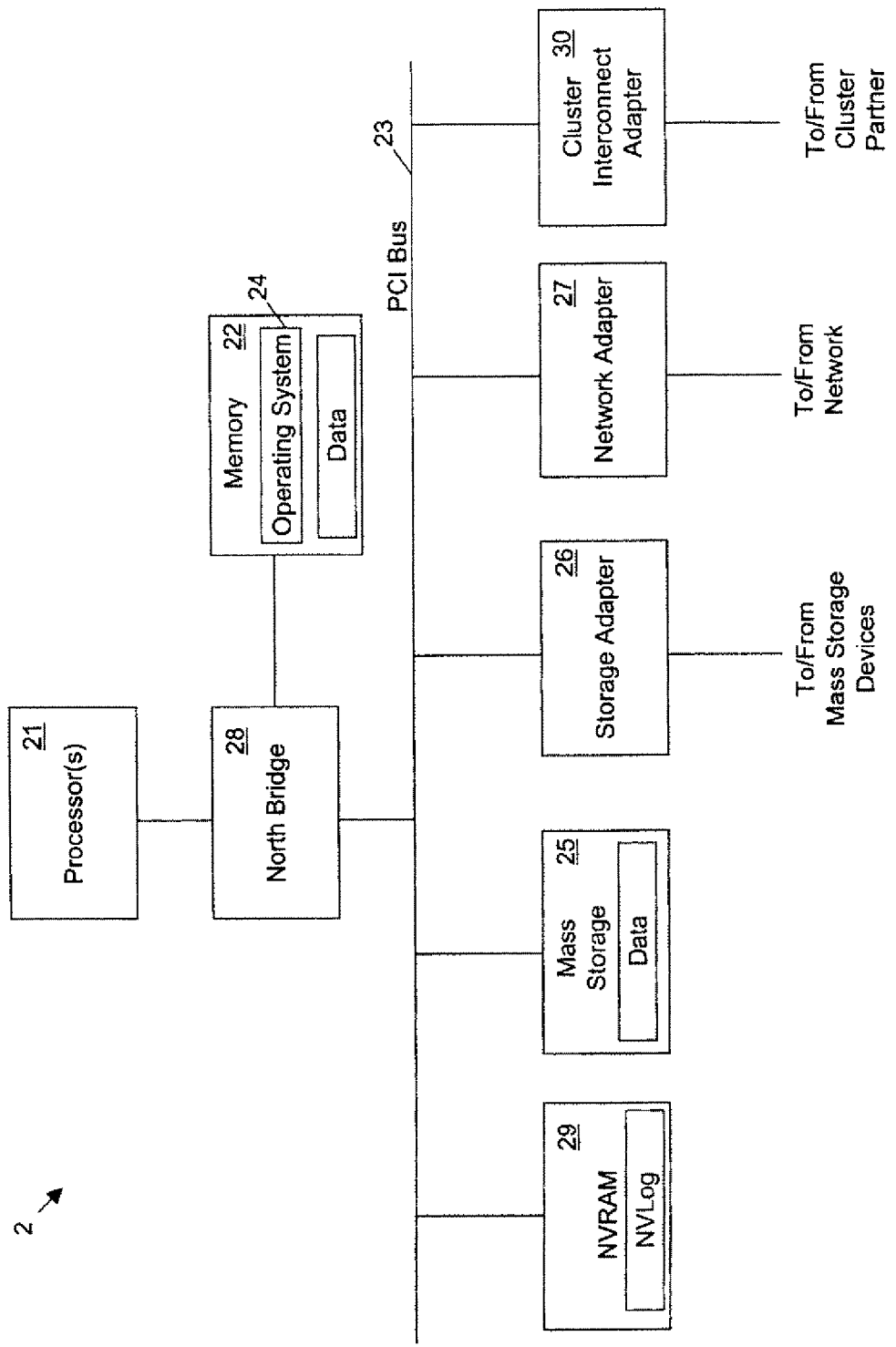
FIG. 2 is a block diagram of a filer in the prior art.
Figure 3:
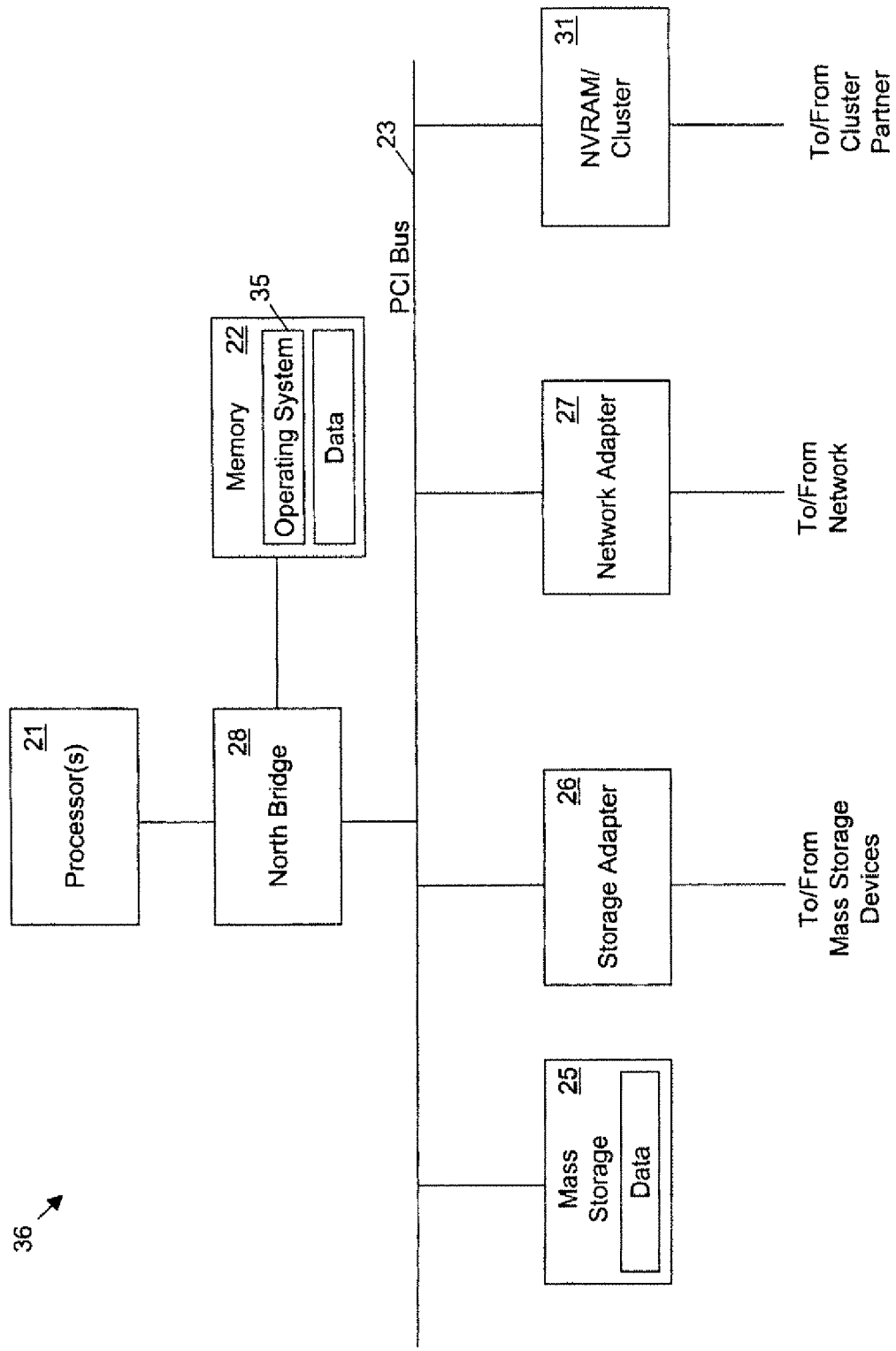
FIG. 3 is a block diagram of a filer that includes NVRAM and a cluster interconnect adapter in a single device in accordance with the invention.

FIG. 3 illustrates an example of the architecture of a filer 36 in accordance with the invention. The filer 36 can be substantially similar to the filer 2 described in FIG. 2, except that the NVRAM 32 and cluster interconnect adapter 33 of filer 36 are provided in a single PCI device, i.e., the NVRAM/cluster device 31. The NVRAM/cluster device 31 is a circuit module, such as a removable circuit board/card (such as an add-in printed circuit board, PCMCIA card, or the like, hereinafter all referred to as a "card"), with electronic components mounted thereon and or embedded therein. The NVRAM/cluster device 31 includes an NVRAM 32, which is used to store (among other things) the NVLog 34, and a cluster interconnect adapter 33 which enables communication with a remote cluster partner. Because these elements are provided in a single device on the PCI bus 23, only a single PCI transaction is needed to transfer data from system memory 22 to both local NVRAM 32 and the remote cluster partner's NVRAM.

Note that in alternative embodiments, the PCI bus in filer 36 may be replaced by some other type of expansion bus or interconnect, such as a PCI-Express bus, HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"), or the like.

As described in greater detail below, the NVRAM/cluster device 31 implements certain techniques and protocols described in the InfiniBand Architecture Specification, Release 1.1, Nov. 6, 2002 (hereinafter "InfiniBand specification"), which is incorporated herein by reference. In particular, InfiniBand techniques are used to implement LDMA to access local NVRAM 32 and to implement RDMA to access the cluster partner's NVRAM. Information is communicated to local NVRAM 32 and to the cluster partner in InfiniBand data packets. Certain types of information, as described below, are communicated in InfiniBand subnet management packets (SMPs).

NVRAM/Cluster Device Architecture

Figure 4:
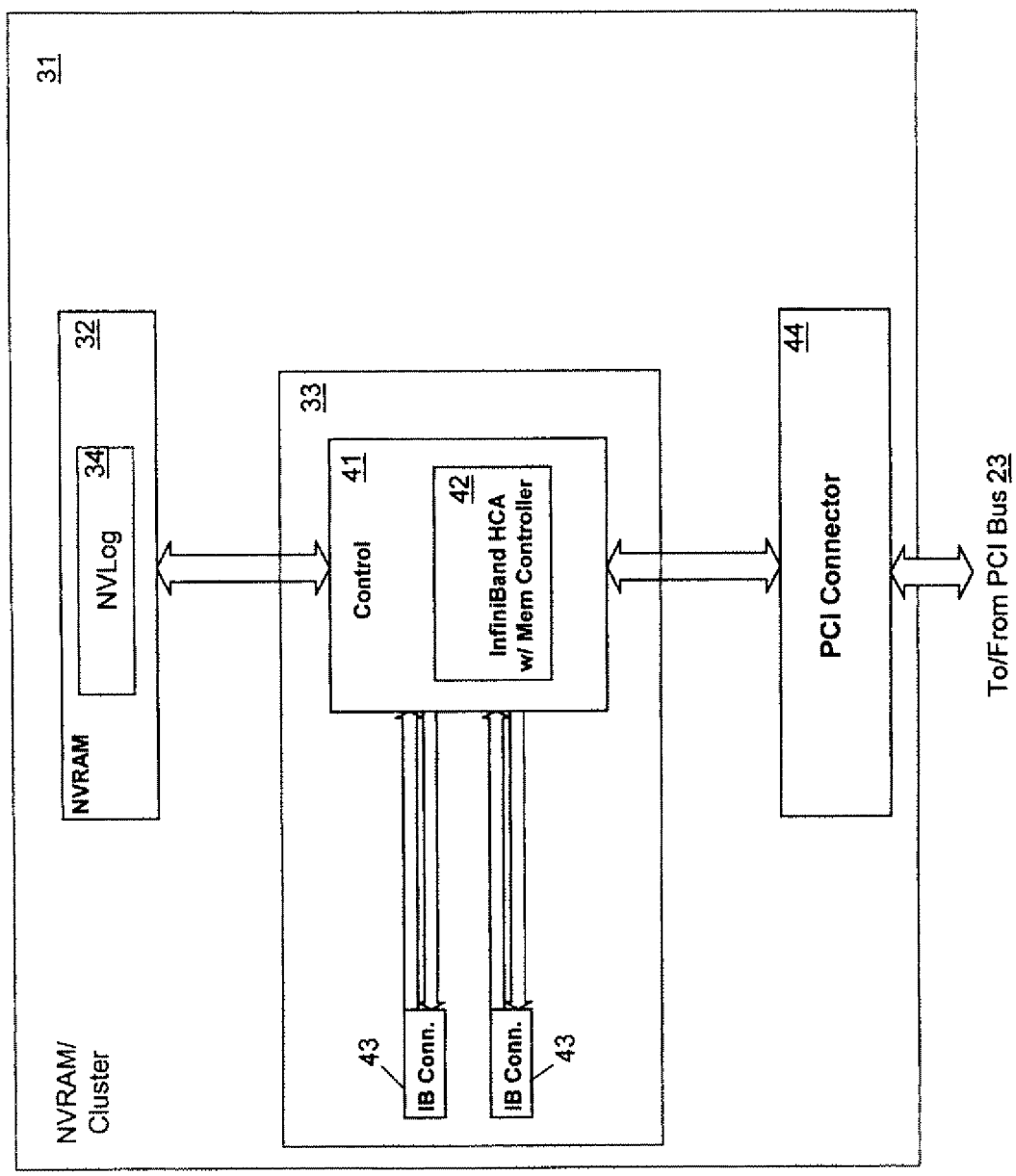
FIG. 4 is a high-level block diagram of the NVRAM/cluster interconnect device according to embodiments of the invention.

Refer now to FIG. 4, which shows at a high level the architecture of the NVRAM/cluster device 31, according to certain embodiments of the invention. As shown, the NVRAM/cluster device 31 includes NVRAM 32 and cluster interconnect adapter 33. The cluster interconnect adapter 33 includes control circuitry 41, a PCI connector 44, and two or more InfiniBand (IB) copper connectors 43. The PCI connector 44 couples the NVRAM/cluster device 31 to the PCI bus 23. The NVRAM 32 is used to store the NVLog 34 and other critical information which is important to preserve between consistency points. The control circuitry 41 is coupled to the NVRAM 32, the PCI connector 44 and the IB connectors 43. The control circuitry 41 controls the overall operation of the NVRAM/cluster device 31, including: access to NVRAM 32 using InfiniBand internal ("loopback") RDMA operations (hereinafter referred to as "LDMA") and/or programmed input/output (PIO) operations; communication with the cluster partner's NVRAM using InfiniBand RDMA operations; and/or communication with other components in the cluster partner using InfiniBand Send/Receive operations. The control circuitry 41 includes an InfiniBand host channel adapter (HCA) 42, which has a built-in memory controller (not shown).

Figure 5:
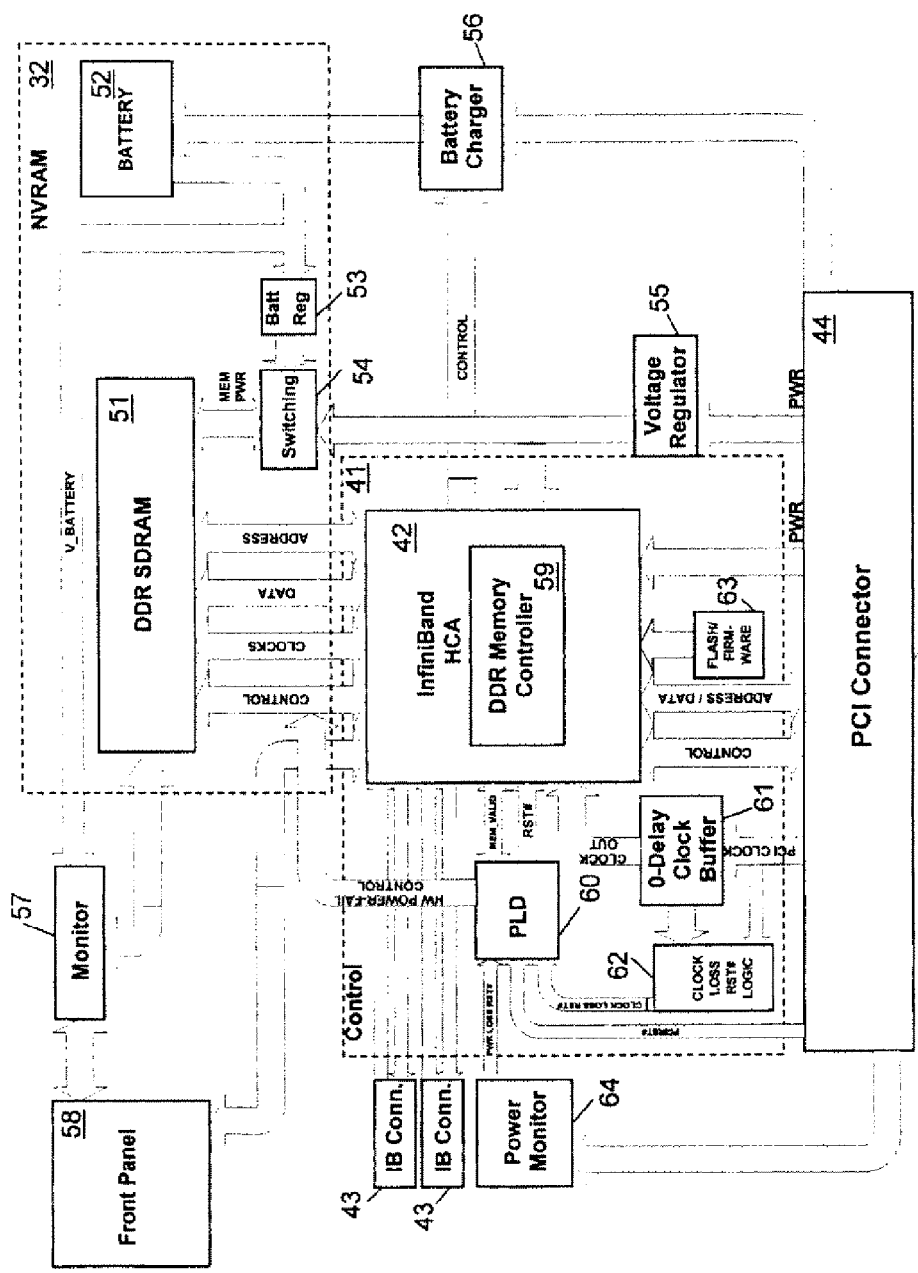
FIG. 5 is a detailed block diagram of the NVRAM/cluster interconnect device according to embodiments of the invention.

FIG. 5 illustrates the NVRAM/cluster device 31 in greater detail, according to certain embodiments of the invention. In particular, FIG. 5 shows further detail of the NVRAM 32, the control circuitry 41, and other components of the NVRAM/cluster device 31. The NVRAM 32 in the illustrated embodiment is implemented by a double data rate synchronous dynamic RAM (DDR SDRAM) 51, which is made nonvolatile by providing it with regulated backup power from an onboard Lithium battery 52. Battery power is provided through a regulator 53 to switching circuitry 54, which provides the SDRAM 51 with either the regulated power from the battery or regulated power received from the PCI connector (system power) 44. A second voltage regulator 55 receives system power from the PCI bus 23 and outputs regulated system power to the switching circuitry 54 and the HCA 42.

Normally, the SDRAM 51 receives regulated system power, however, if the system power drops below a predetermined voltage threshold, the switching circuitry 54 switches the SDRAM 51 onto regulated battery power. A battery charger 56 receives system power from the PCI bus to charge the battery 52 under control of the HCA 42.

The NVRAM/cluster device 31 also includes a monitor 57 to monitor the battery voltage and the status of the SDRAM 51. In addition, the NVRAM/cluster device 31 includes a front panel display 58 to output to a user indications of the aforementioned status information and other status information received from the HCA 42.

The control circuitry includes an InfiniBand HCA 42 with a built-in DDR memory controller 59 to control access to the SDRAM 51 (i.e., the HCA and the memory controller are on the same chip). Note that in alternative embodiments, the HCA and memory controller could be on separate chips, however. The HCA 42 has communication interfaces with the PCI bus and the SDRAM for control, clocks, data, and addresses.

The control circuitry 41 also includes a programmable logic device (PLD) 60, a zero-delay clock buffer 61, a clock loss reset logic circuit 62, and a flash memory 63. The zero-delay clock buffer 61 eliminates dependency on PCI clock implementation differences on different platforms, receiving as input the PCI clock from the PCI bus and outputting to the HCA 42 a clock signal CLOCK OUT that is in-phase with the PCI clock. The clock loss reset logic circuit 62 is used to detect loss of the PCI clock from the PCI bus and outputs a CLOCK LOSS RST # to the PLD 60 as an indication thereof.

The NVRAM/cluster device 31 also includes a power monitor 64, which detects loss of system power from the PCI bus and outputs a PWR LOSS RST # signal to the PLD 60 as an indication thereof. The PLD 60 includes logic circuitry that implements a RESET tree, i.e., logic used to reset the HCA 42 and/or the SDRAM 51 if any of various predetermined conditions occurs (e.g., loss of power, loss of clock, etc.). The PLD 60 provides its output to the HCA 42 and the SDRAM 51. The PLD 60 optionally includes any other miscellaneous logic that may be desired. The flash memory 63 contains any firmware required by the HCA 42.

Software Architecture

Figure 6:
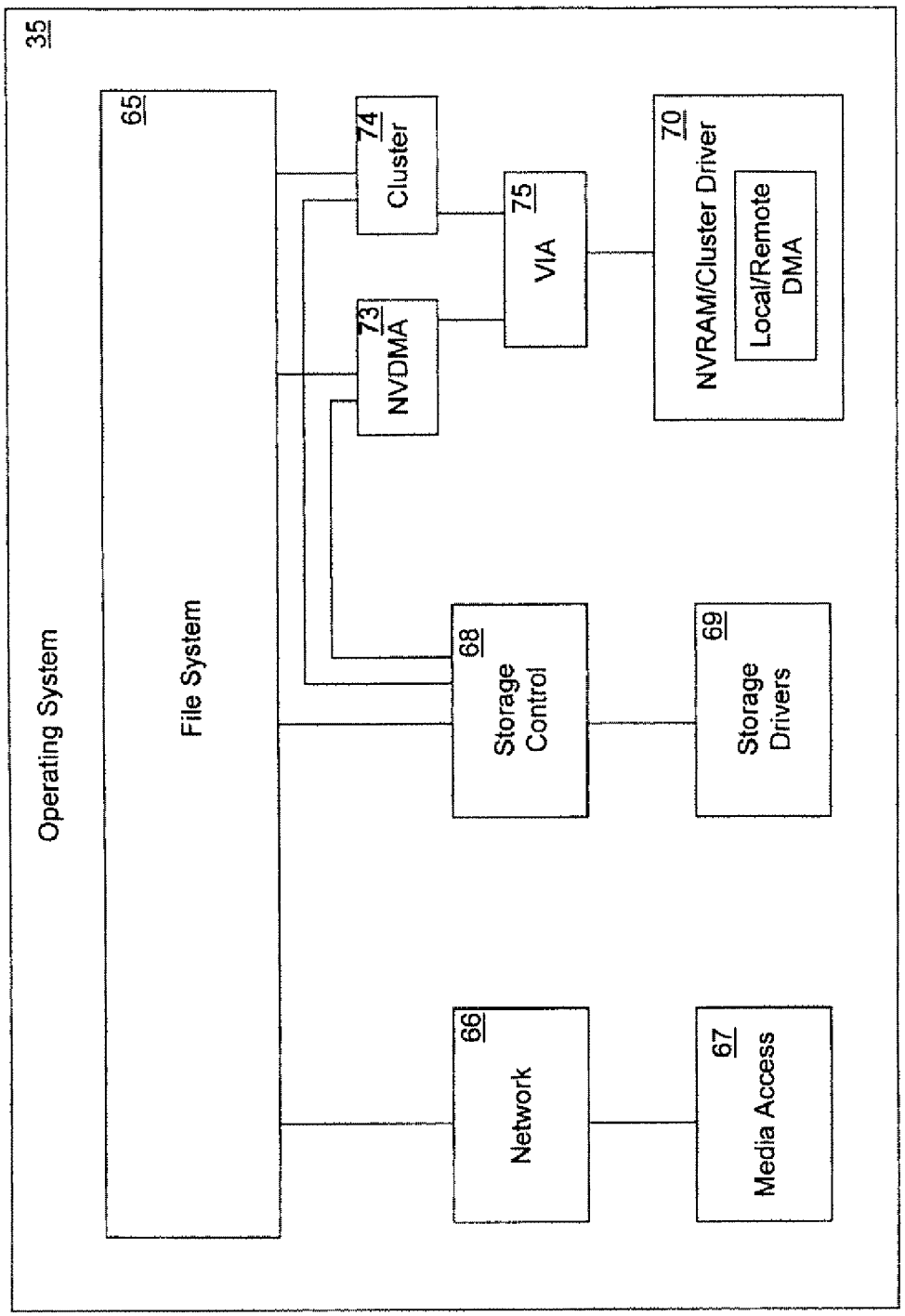
FIG. 6 is a block diagram of the operating system of the filer shown in FIG. 3 according to embodiments of the invention.

Refer now to FIG. 6, which shows the operating system 35 of filer 36, according to certain embodiments of the invention. The operating system 35 includes several modules, or layers. These layers include a file system 65. The file system 65 is a programmatic entity that imposes structure on an address space of the filer's storage devices in order to conveniently deal with data containers, including files and blocks. The file system 65 executes read and write operations on the mass storage devices 4 in response to client requests, maintains directories of stored data, etc. Logically "under" the file system 65, the operating system 35 also includes a network layer 66 and an associated media access layer 67, to allow the storage server to communicate over a network (e.g., with clients 1). The network access 66 layer may implement any of various protocols, such as NFS, CIFS and/or HTTP. The media access layer 67 includes one or more drivers which implement one or more protocols to communicate over the network, such as Ethernet. Also logically under the file system 65, the operating system 35 includes a storage access layer 68 and an associated storage driver layer 69, to allow the filer 2 to communicate with external mass storage devices 4. The storage access layer 68 implements a disk storage protocol such as RAID, while the storage driver layer 69 implements a lower-level storage device access protocol, such as Fibre Channel or SCSI. The details of the above-mentioned layers of the operating system 35 are not necessary for an understanding of the invention and, hence, need not be described herein.

As indicated above, the software for LDMA (for local NVRAM) and RDMA (for clustering) are merged into one software stack, such that a single driver is used to control both functions; the single driver is NVRAM/cluster driver 70, illustrated in FIG. 6. The NVRAM/cluster driver 70 is the driver software which controls the hardware of the NVRAM/cluster device 35. Logically under the file system 65, the operating system 35 further includes a DMA module (henceforth "NVDMA") 73 for LDMA to NVRAM, a cluster module 74 for RDMA to the cluster partner, a Virtual Interface Architecture (VIA) module 75, and (at the lowest logical level) the NVRAM/cluster driver 70. The NVRAM/cluster driver includes code to control LDMA access to local NVRAM and code to control access to the cluster partner's NVRAM.

The NVDMA module 73 and the cluster module 74 provide the high-level control of the LDMA and RDMA operations, respectively, in response to either the file system or the storage access (e.g., RAID) layer. The LDMA and RDMA functionality are merged into a common software stack at the VIA module, which operatively couples the NVDMA module 73 and cluster module 74 to the NVRAM/cluster driver 70. Thus, communication to the NVRAM/cluster driver 70 from higher levels of the operating system is done using the VIA protocol, as implemented by the VIA module 75. Storage to local NVRAM 32 (LDMA) or the cluster partner's NVRAM (RDMA) may be initiated by either the file system 65 or the storage access layer 68. DMA operations initiated by the file system 65 include logging of write requests in NVLog 34. DMA operations initiated by the storage access layer may include, for example, storage of RAID-specific data or metadata used to maintain integrity of data stored on disks.

NVRAM/Cluster Operational Features

A storage system such as filer 36 can provide a variety of advantageous features in conjunction with the NVRAM/cluster device 31, as will now be described.

LID Assignment

As described above, the NVRAM/cluster device 31 in certain embodiments uses InfiniBand technology to DMA data to local or remote NVRAM. Under the InfiniBand specification, such DMA can only be performed after a Local Identifier (LID) has been assigned to each InfiniBand node. Under the InfiniBand specification, an LID is normally assigned to each node by a separate device, known as a subnet manager, in a fairly cumbersome process. Filer 36, however, is capable of assigning a unique LID to the NVRAM/cluster device 31 without the use of a subnet manager, and of doing so very early in the boot cycle. Early LID assignment allows the operating system to start DMA of data to the NVRAM/cluster device 31, and other types of communications, without even having to wait until communication is established with the cluster partner or any other external entity, such as a subnet manager, which is not needed. This feature is advantageous, since it allows the filer 36 to begin servicing client requests earlier than would otherwise be possible.

The NVRAM/cluster driver 70 is started very early in the boot cycle of the operating system 35, i.e., as soon as the presence of the NVRAM/cluster device 31 is detected on the PCI bus 23. When the NVRAM/cluster driver 70 is started, it reads a unique serial number stored on-board the NVRAM/cluster device 31, which may be a serial number assigned by the manufacturer and programmed into a nonvolatile memory, such as flash memory 63. The NVRAM/cluster driver 70 uses a predetermined portion of the serial number (e.g., the last 16 bits) to create a unicast LID in the range of 1 to 0xbfff. For example, the last 16 bits can be simply converted to hexadecimal (if not already in hexadecimal) and used as the LID. The LID is then assigned to each of the IB ports 43 on the NVRAM/cluster device 31. This LID assignment allows the operating system 35 to start LDMA (DMA between system memory 22 and local NVRAM 32 of the filer 36) and other types of communications.

When communication with the cluster partner is initiated, this LID is sent to the cluster partner in the data payload of an InfiniBand subnet management packet (SMP). As is well known, an InfiniBand SMP is a type of InfiniBand management datagram (MAD). The filer 36 also receives the LID of the NVRAM/cluster device 31 in the cluster partner in a similar SMP. Once the two nodes have exchanged their LIDs, they can start sending data back and forth using standard InfiniBand packets. Assuming the operating systems of the filer 36 and its cluster partner are essentially the same, one can rely on the fact that they will perform the same steps, and obtain each other's LID correctly.

Use of SMPs

The filer 36 uses InfiniBand SMPs to exchange LIDs (as just noted) as well as other information, with a remote cluster partner. SMPs according to the InfiniBand specification have a standard format and only allow certain information to be exchanged between end nodes. However, because the cluster partners described above are in a closed InfiniBand network, it is possible to send whatever type of data is desired in an SMP. As long as the correct header is present, the SMP will reach the other node (cluster partner) and will be processed on the cluster partner.

In certain embodiments of the invention, a particular type of SMP called a Set PortInfo Management Datagram is used to communicate the following information between cluster partners:

Local node's LID (used by the remote node to send data packets to this node)

Queue Pair (QP) number to be used to set up the initial connection

Memory handle to be used to set up the initial connection

Memory address to be used to set up the initial connection

Note that while only four fields inside the SMP are described as being used here, this approach allows the use of as many fields as needed, provided the overall packet size is below the limit set by the InfiniBand specification. Furthermore, other types of SMPs could also (or alternatively) be used, as long as the header is set correctly and the packet size meets the restrictions placed by the InfiniBand specification.

Management data (e.g., LIDs, QP numbers, memory handles and memory addresses) are transmitted in SMPs to a "promiscuous" address, such as 0xFFFF. Other types of data, which are transmitted after the LIDs have been assigned and connections have been established, are transmitted in standard InfiniBand data packets addressed using the LID of the destination filer.

This approach has advantages. For instance, SMPs are used to exchange LIDs between the cluster partner in a simple manner, without involving any subnet manager or a switch. This approach also allows different versions of the NVRAM/cluster driver 70 running on different storage systems (e.g., different filers) to communicate with each other. Specific information in the SMP can tell each driver how to establish a connection with the remote node.

Loopback QPs

Under the InfiniBand specification, a communication connection is defined by two endpoints known as queue pairs (QPs). Typically, the QPs that form a connection are on different hosts connected over an InfiniBand link. Each QP includes a send queue and a receive queue. The send queue is a first-in and first-out (FIFO) buffer for data to be transmitted to another InfiniBand node, while receive queue is a FIFO buffer for data that has been received from another InfiniBand node.

For LDMA, however, all of the communication happens inside a single host (e.g., within filer 36) without traversing an InfiniBand link. The QPs that participate in this kind of internal communication are known as "loopback" QPs. In accordance with certain embodiments of the invention, "loopback" QPs can be used to implement LDMA (i.e., storage in local NVRAM 32) in the filer 36.

In order to use a QP, it must be first connected to another QP to form a connection. The former QP is called a source QP and the latter one is called a destination QP. The InfiniBand specification does not allow a single QP to be used as both source and destination loopback QP.

As noted above, local NVRAM 32 may be used by either the file system 65 or the storage access (e.g., RAID) layer 68.

Consequently, in order to implement LDMA in the filer 36, two separate channels are needed: one for file system data traffic and another for RAID data traffic. A simple solution can be described as follows:

Channel 1 (File system traffic): QP1 (source)→QP1' (destination)

Channel 2 (RAID traffic): QP2 (source)→QP2' (destination)

Figure 7A:
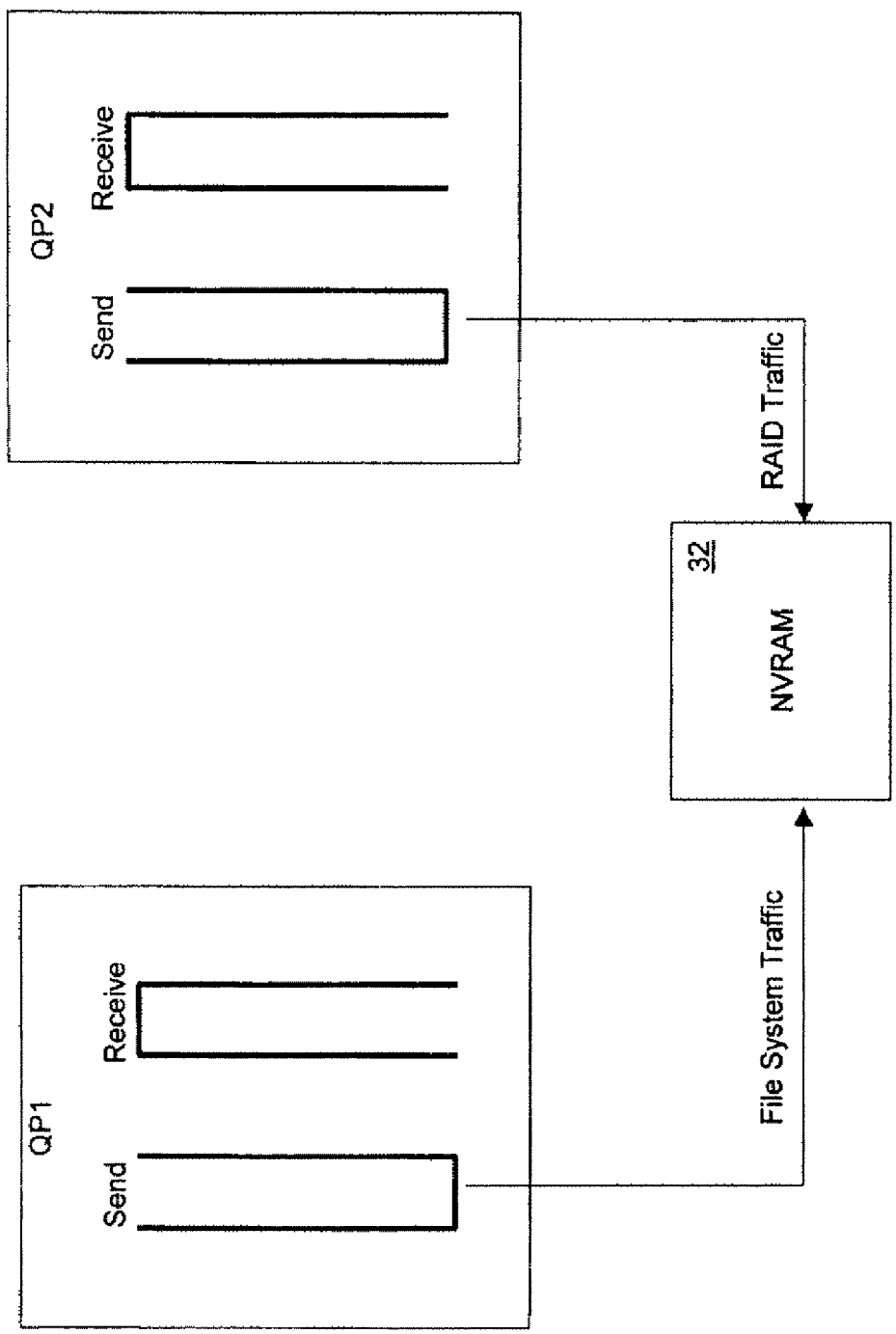
FIG. 7A illustrates the use of loopback queue pairs for file system data traffic and RAID data traffic according to a first embodiment of the invention.

This solution uses four QPs and requires two separate connections. A better solution, which uses InfiniBand LDMA (i.e., internal RDMA) Write operations and requires only two QPs and only one connection, can be described as follows, as illustrated in FIG. 7A:

QP1 (source for File system traffic)→NVRAM 32

QP2 (source for RAID traffic)→NVRAM 32

The send queue of QP1 is the source of data traffic for writes to local NVRAM 32 initiated by the file system layer 65. The send queue of QP2 is the source of data traffic for writes to local NVRAM 32 initiated by the storage control (e.g., RAID) layer 68. The receive queues of QP1 and QP2 are not used at all; the transferred data directly appears in the memory mapped buffers.

There are two main advantages to this approach. First, a QP is a major resource in an InfiniBand solution. A QP uses host memory and memory on the adapter. In applications that require numerous loopback connections, this approach provides a 50% reduction in the consumption of this resource, as well as a 50% reduction in connection requests and responses. Second, this reduction in QP requirements and connection messages also has a performance benefit. The software and hardware have to iterate over fewer QPs, and the system can be set up much faster.

Figure 7B:
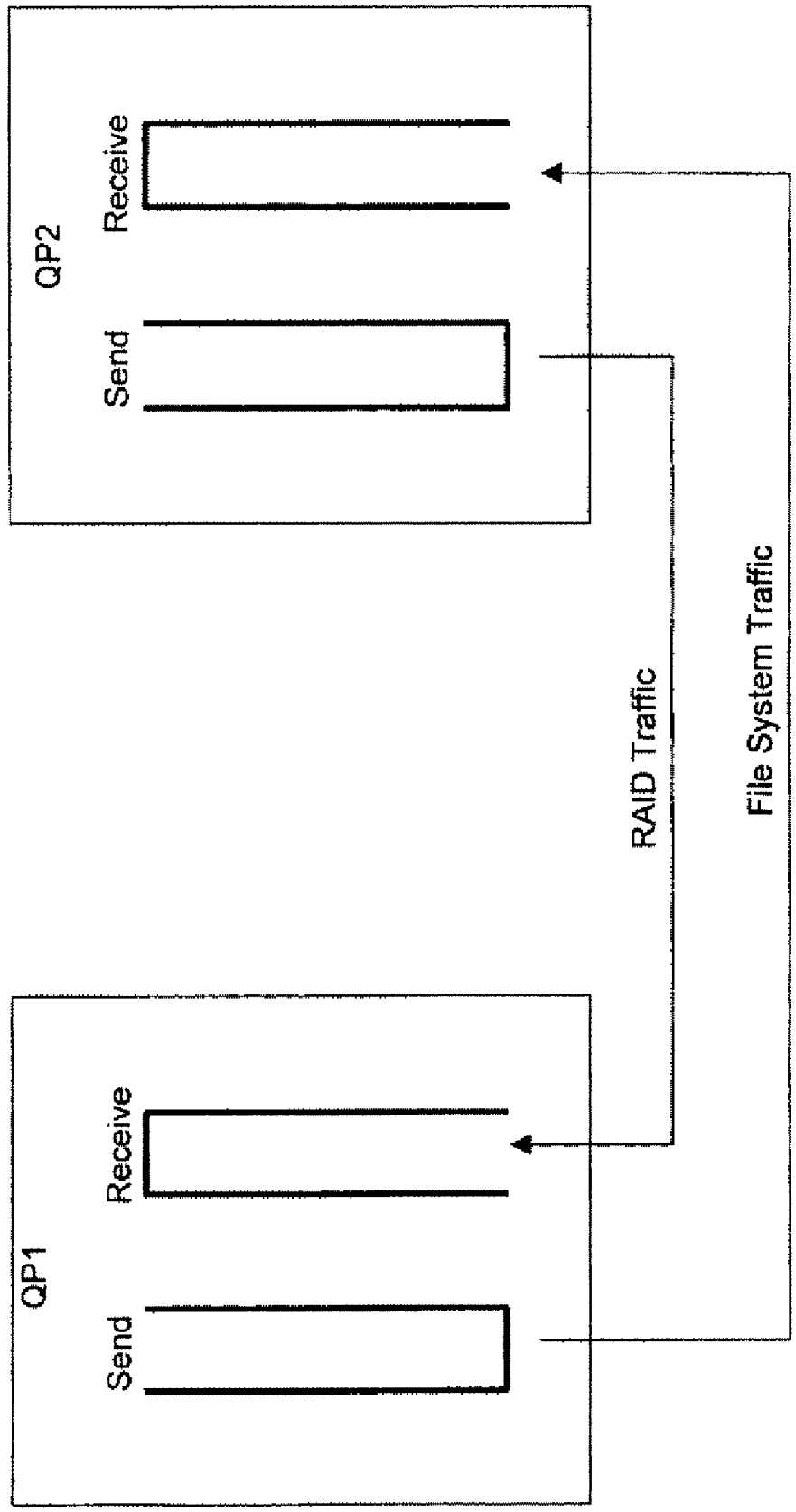
FIG. 7B illustrates the use of loopback queue pairs for file system data traffic and RAID data traffic according to a second embodiment of the invention.

An alternative solution, in which InfiniBand Send/Receive operations are used for data transfer rather than LDMA, can be described as follows and is illustrated in FIG. 7B:

QP1 (source for File system traffic, destination for RAID traffic)←→QP2 (source for RAID traffic, destination for File system traffic)

The send queue of QP1 is the source of file system traffic, while the receive queue of QP1 is the destination of RAID traffic. Similarly, the send queue of QP2 is the source of RAID traffic, while the receive queue of QP2 is the destination of file system traffic.

Multicasting

The data flow in a conventional filer cluster is from system memory 22 to local NVRAM 29, then from local NVRAM 29 to the cluster interconnect adapter 36, and finally from the cluster interconnect adapter 36 to the cluster partner's NVRAM (see FIG. 2). This is essentially a store-and-forward model, where the data is first sent to local NVRAM 29 and then forwarded to the cluster partner's NVRAM. The problem with this model is that data cannot be sent to the cluster partner's NVRAM until it is available in local NVRAM 29. This delay introduces latency for client operations, thereby increasing response time. Response time is a key performance measure in a storage system such as a filer.

Figure 8:
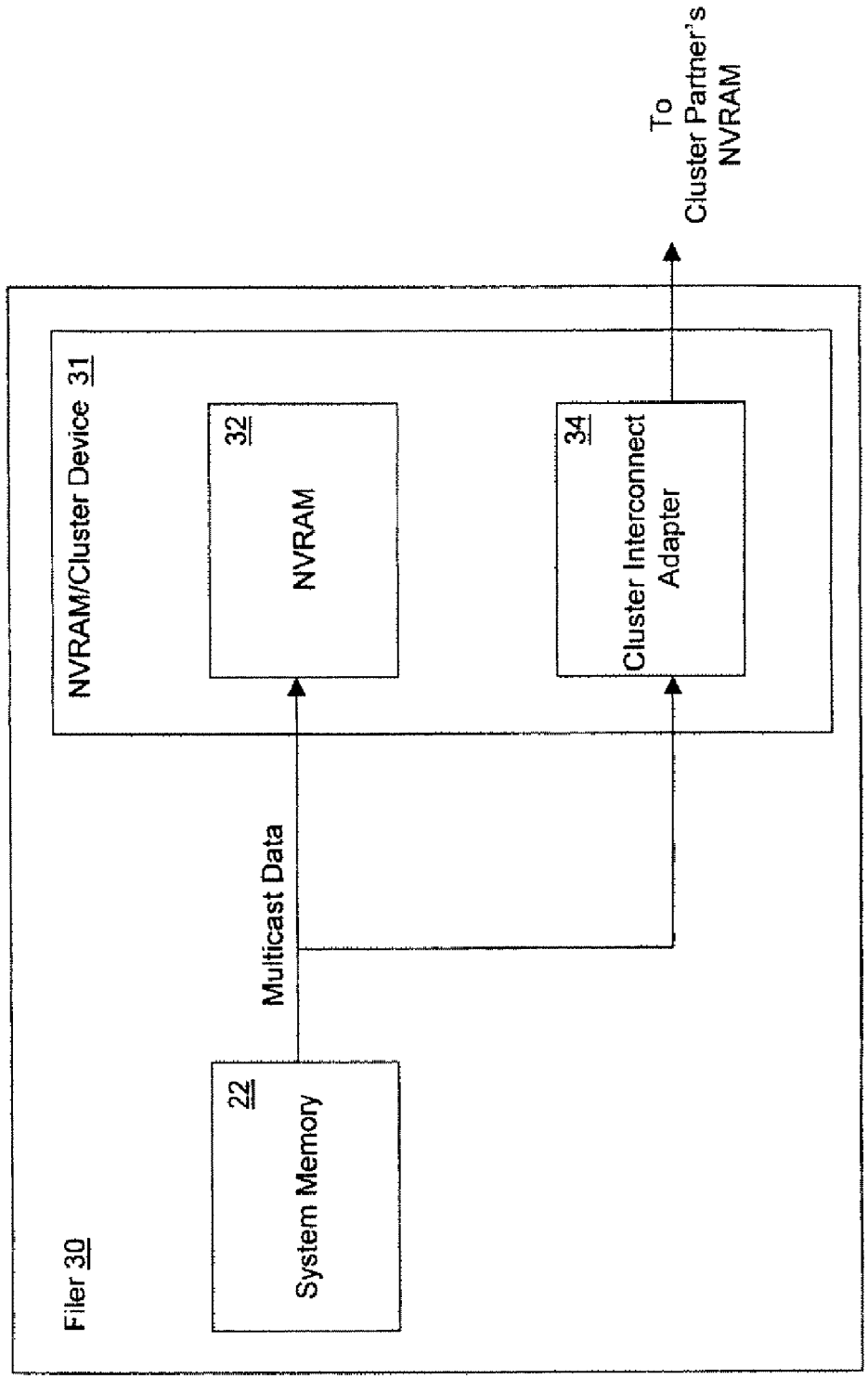
FIG. 8 illustrates the multicasting of data from system memory to NVRAM and a cluster interconnect adapter according to embodiments of the invention.

The InfiniBand specification defines a technique, known as multicast, which allows InfiniBand messages to be sent to multiple destinations using a single operation. In accordance with certain embodiments of the invention, as illustrated in FIG. 8, the multicast technique defined in the InfiniBand specification (hereinafter "InfiniBand multicast") is used to send data from system memory concurrently to both local NVRAM 32 and remote NVRAM (of a cluster partner) with a single hardware operation. This approach reduces latency and improves performance. A single InfiniBand message with two destinations is created and launched with a single Infini- Band multicast operation. This multicast operation completes only upon receiving confirmation that the data has successfully reached both destinations. In this model, the two data transfer operations are overlapped in time, thereby reducing total latency.

There are at least two advantages to this approach. The first is performance: The latency overhead inherent in clustering can be dramatically reduced, thereby improving response time in filer clusters. The second advantage is simplicity: Traditional cluster nodes have separate code paths to launch LDMA and RDMA operations and separate processes that wait for these operations to complete. With the multicast approach, all of the clustering functionality can be merged with the local NVRAM functionality, which substantially reduces the synchronization overhead involved in launching and monitoring separate data transfer operations.

Virtual Lanes

The NVRAM/cluster device provides the capability to perform both LDMA and RDMA using the same circuit card (or other single device). In that regard it is desirable to protect LDMA traffic from potential InfiniBand link errors. Specifically, any problems on the cluster interconnect that cause packets to be backed up at the port could also stall LDMA on that node. LDMA failure can be extremely harmful for a storage system such as a filer. Accordingly, introduced now is a method which eliminates some causes for LDMA failure.

The InfiniBand specification provides for the use of "virtual lanes" (VLs), which allows multiple independent data streams to share the same physical link. The InfiniBand specification provides that up to 15 VLs can be used on a link between two end points. Each VL can have its own set of quality of service (QoS) guarantees. In accordance with certain embodiments of the invention, for LDMA (local data transfer), a QP is connected to another QP on the same node. For remote data transfer, a QP is connected to a QP on a remote node (e.g., the cluster partner). Whenever a QP is connected to another QP (either on the same node or a remote node), a VL needs to be specified for the connection.

In accordance with certain embodiments of the invention, therefore, one VL is used for a connection between two QPs on the same storage system (e.g., filer), and another VL is used for a connection between two QPs on different nodes. Thus, local (loop back) connections are assigned to different VLs from remote connections. Consequently, if for any reason data backs up on the cluster interconnect, only traffic assigned to the corresponding VL will be affected. Since LDMA is on a different VL, it will not be affected by the backup. This approach, therefore, insulates LDMA traffic from InfiniBand link errors and reduces the likelihood of LDMA failures.

Active/Passive Ports

In certain embodiments of the invention, the filer 36 uses multipathing in its connection with its cluster partner to provide seamless failover of data traffic from one link to another. One possible approach to handling a failure on the cluster interconnect is that, when the driver software detects transport errors on a link, it tears down the existing connections on that link and reestablishes the connection on the backup link (port). However, this approach causes disruption in data transfer for the higher levels of software. As a result, the clustering capability is disabled when the connections are reestablished, leaving clients 1 vulnerable to filer failures.

The filer 36, therefore, provides a better solution to this problem in certain embodiments of the invention. When the filer 36 boots up, the NVRAM/cluster driver 70 attempts to bring up (initialize) both of its links (i.e., both of its InfiniBand ports). The filer 36 then exchanges SMPs with its cluster partner using these links. Once both links are up, one of the links (ports) is designated as the active port, and the other link (port) is designated as the passive (or inactive) port. Next, QPs are created and connected with the corresponding QPs on the remote node. While setting up the connection, the NVRAM/cluster driver 70 causes the NVRAM/cluster device 31 to send packets over the active port. The NVRAM/cluster driver 70 also sets fields in the hardware context telling the hardware to failover the packets to the passive link if there are any problems on the active link.

When attempting to send a packet over the current active link, the NVRAM/cluster device 31 will attempt up to a predetermined number of retries if it encounters any errors. If all of the retries fail, the passive link is redesignated as the active link, and the failed active link is redesignated as a failed link. The NVRAM/cluster device 31 then monitors the state of the failed link. When the failed link comes up again, it is marked as the passive link for that QP.

In certain embodiments, detection of link failures and redesignation of the links as active or passive is performed by the HCA 42, in which case the HCA 42 also notifies the software of the failover. No operating system intervention is needed to perform the failover.

Boot Process

Figure 9A:
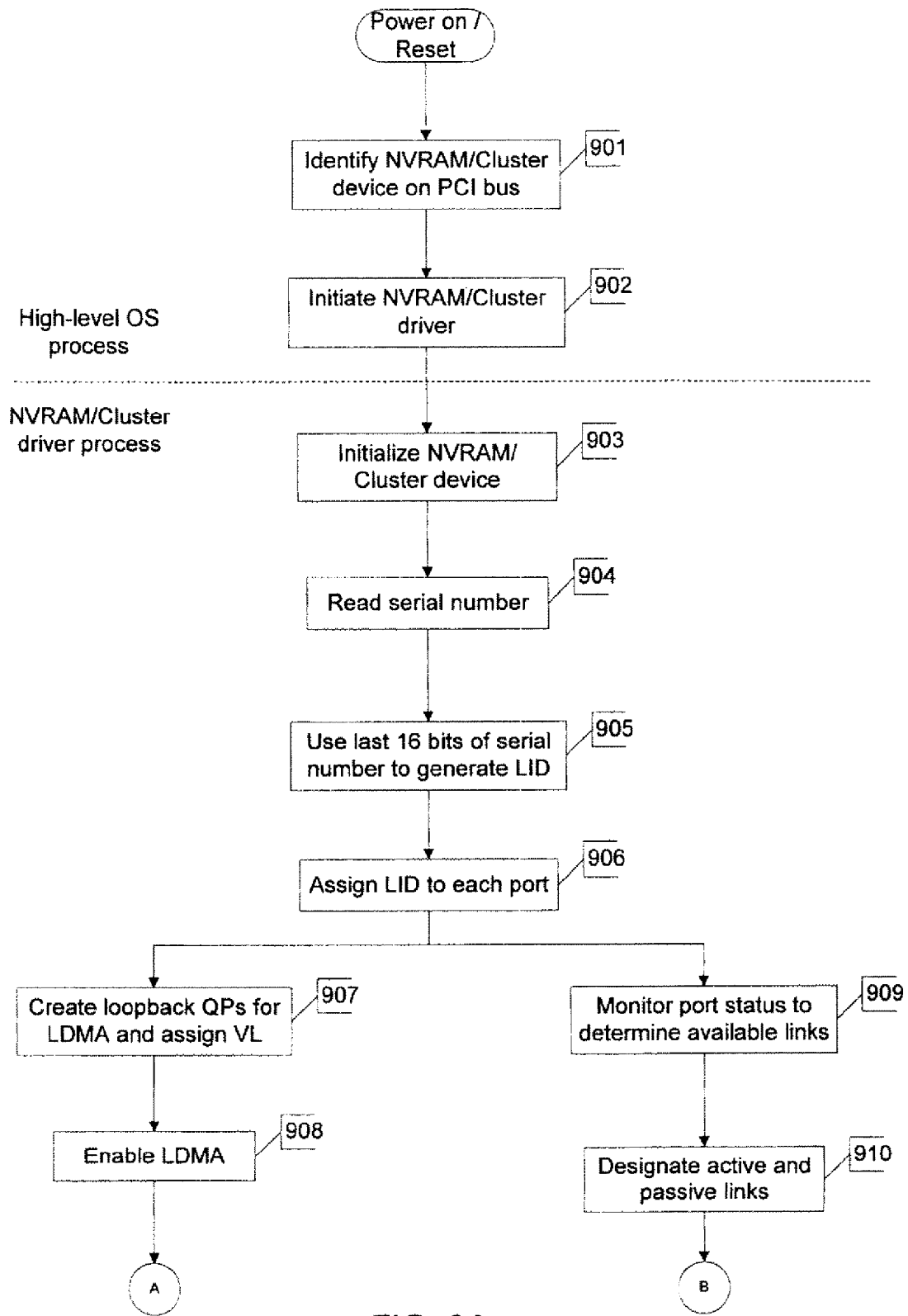
FIGS. 9A and 9B show a process performed at boot up by the filer shown in FIG. 3, according to embodiments of the invention.
Figure 9B:
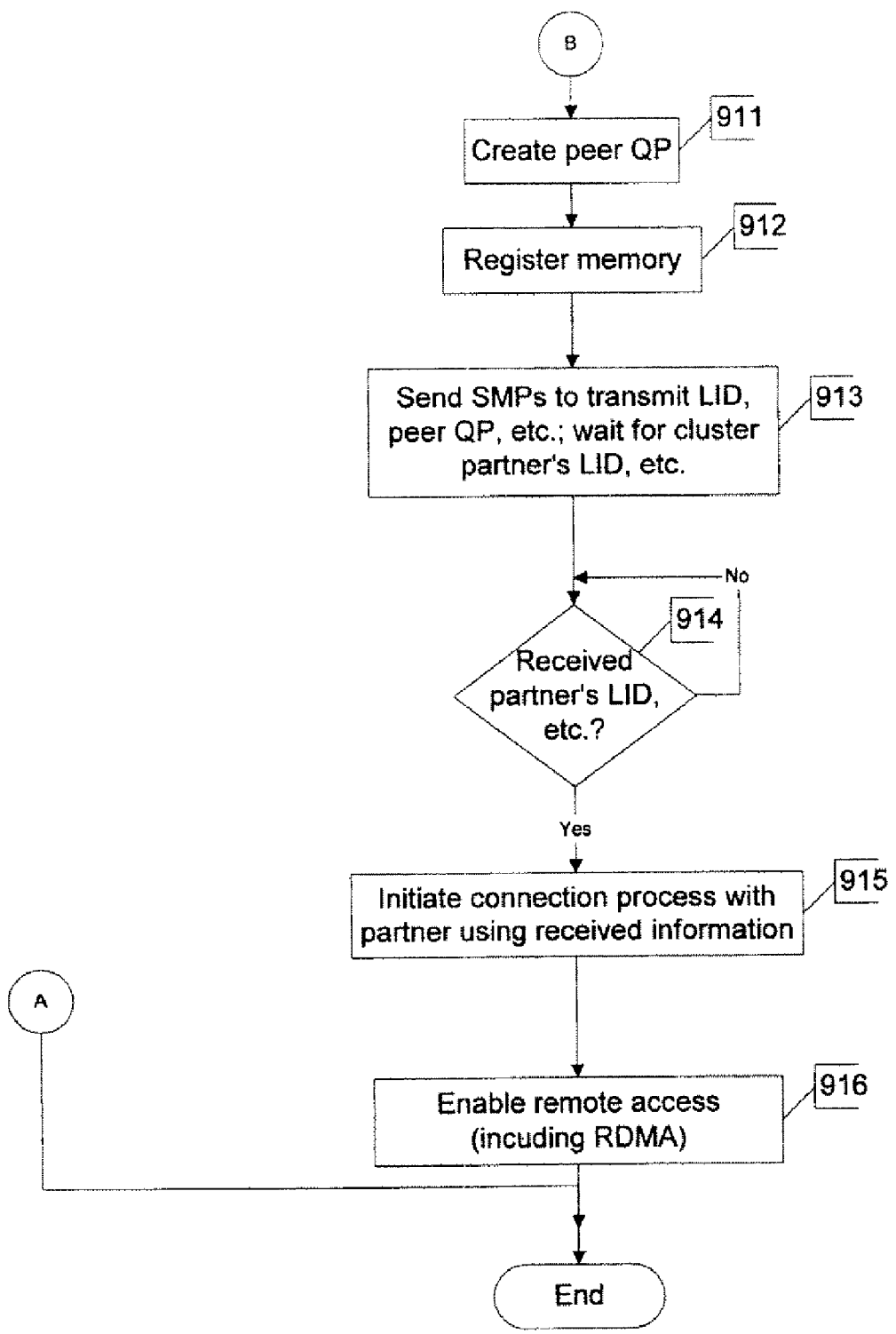

Refer now to FIGS. 9A and 9B, which collectively show a portion of the boot process of the filer 36 that is relevant to the features and techniques described above, according to certain embodiments of the invention. Initially, in response to a power on or reset condition, at 901 the operating system 35 identifies any devices which are connected to the PCI bus 23. Upon identifying the NVRAM/cluster device 31 as a connected device at 902, the operating system 35 initiates the NVRAM/cluster driver 70 at 903. The remaining operations shown in FIGS. 9A and 9B are performed by the NVRAM/cluster driver 70.

At 903, the NVRAM/cluster device 31 is initialized. Next, the above-mentioned serial number is read from a predetermined location on the NVRAM/cluster device 31 (e.g., from on-board flash memory) at 904. The last 16 bits of the serial number (in at least one embodiment) are then used to generate an InfiniBand LID at 905, which is then assigned at 906 to each InfiniBand ports 43 of the NVRAM/cluster device 31. The process then splits into two parallel subprocesses, as follows.

In the first subprocess, at 907 the NVRAM/cluster driver 70 creates loopback QPs for LDMA and assigns LDMA functions to an appropriate VL. The NVRAM/cluster driver 70 then enables LDMA at 908, and the first subprocess then ends.

In the second subprocess, at 909 the NVRAM/cluster device 31 monitors port status to determine the available communication links and at 910 designates one of the links as an active link and the other(s) as passive link(s). At 911 the NVRAM/cluster driver 70 creates a peer QP at 911 and registers memory (i.e., fixes a virtual-to-physical memory translation to allow the cluster partner to write into the filer's memory) at 912. At 913 the NVRAM/cluster driver 70 transmits the assigned LID, peer QP, memory address, and memory handle for the initial connection, in one or more SMPs to a promiscuous address (see above). The process also waits for the corresponding information to be received in SMPs from the cluster partner. When such information has been received from the cluster partner (914), the NVRAM/cluster driver 70 initiates the connection process with the cluster partner at 915 using the received information. Remote access (including RDMA by the cluster partner) is then enabled at 916. Enabling remote access includes creating QPs and assigning VLs for file system data traffic and RAID data traffic initiated by the cluster partner. After enabling remote access, the second subprocess ends. Of course, numerous variations upon the foregoing process are possible.

Thus, a network storage system with NVRAM and cluster interconnect adapter implemented in a single circuit module has been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A circuit module comprising:
   a circuit medium designed to be installed within a host device;
   a non-volatile memory disposed on the circuit medium, to store log data representing data access requests received by a network storage system; and
   a cluster interconnect adapter disposed on the circuit medium, through which to send the log data to a cluster partner of the network storage system, the cluster interconnect adapter including
      control circuitry to control access to the non-volatile memory and to control communication with the cluster partner, the control circuitry including a host channel adapter;
      a first connector coupled to the control circuitry, to couple the cluster interconnect adapter to an external communication link for communication with the cluster partner; and
      a second connector coupled to the control circuitry, to couple the cluster interconnect adapter to an internal expansion bus of the host device, through which to receive the log data.

2. A circuit module as recited in claim 1, wherein the second connector is configured to connect to a PCI bus.

3. A circuit module as recited in claim 1, wherein the circuit module is a circuit card.

4. A circuit module as recited in claim 1, wherein the non-volatile memory is a non-volatile random access memory.

5. A circuit module as recited in claim 1, wherein the host channel adapter comprises an InfiniBand host channel adapter.

6. A circuit module as recited in claim 1, wherein the circuit module is controllable to store data in the non-volatile memory during a local direct memory access (DMA) operation executed, and to store the data in a memory of the cluster partner via the cluster interconnect adapter during a remote DMA executed from the network storage system.

7. A circuit module as recited in claim 6, wherein the local DMA operation and the remote DMA operation are in response to a single transaction on the expansion bus.

8. A circuit module as recited in claim 6, wherein the local DMA operation comprises sending an InfiniBand message and using a loopback queue pair.

9. A circuit module as recited in claim 6, wherein the local DMA operation and the remote DMA operation are both in response to a data access request received from a client of the data storage system.

10. A circuit module as recited in claim 9, wherein the local DMA operation and the remote DMA operation each comprise sending data in an InfiniBand message.

11. A network storage system comprising:
   a processor;
   a storage adapter coupled to the processor;
   a network adapter coupled to the processor; and
   a circuit module coupled to the processor and separate from the storage adapter and the network adapter, the circuit module including
      a circuit medium designed to be installed within a host device;
      a non-volatile memory disposed on the circuit medium, to store the log data representing data access requests received by the network storage system, and
      a cluster interconnect adapter disposed on the circuit medium, through which to send the log data to a cluster partner, the cluster interconnect adapter including
         control circuitry to control access to the non-volatile memory and to control communication with the cluster partner, the control circuitry including a host channel adapter;
         a first connector coupled to the control circuitry, to couple the cluster interconnect adapter to an external communication link for communication with the cluster partner; and
         a second connector coupled to the control circuitry, to couple the cluster interconnect adapter to an internal expansion bus of the host device, through which to receive the log data.

12. A network storage system as recited in claim 11, wherein the circuit module is a circuit card.

13. A network storage system as recited in claim 11, wherein the non-volatile memory is a non-volatile random access memory.

14. A network storage system as recited in claim 11, wherein the host channel adapter comprises an InfiniBand host channel adapter.

15. A network storage system as recited in claim 11, wherein the network storage system comprises a filer.

16. A network storage system as recited in claim 11, wherein the circuit module is controllable to store data in the non-volatile memory during a local direct memory access (DMA) operation executed in the network storage system, and to store the data in a memory of the cluster partner via the cluster interconnect adapter during a remote DMA executed from the network storage system.

17. A network storage system as recited in claim 16, wherein the local DMA operation and the remote DMA operation are performed in response to a single transaction on the expansion bus.

18. A network storage system as recited in claim 17, wherein the local DMA operation comprises sending an InfiniBand message and using a loopback queue pair.

19. A network storage server comprising:
   a processor;
   a system memory coupled to the processor;
   a network adapter coupled to the processor, through which to receive a write request from a host over a network;
   a storage adapter coupled to the processor, through which to access data stored in a mass storage facility in response to the write request;
   an expansion bus coupled to the processor; and
   a peripheral unit coupled to the expansion bus and separate from the storage adapter and the network adapter, the peripheral unit including
      a circuit medium designed to be installed within a host device;

a non-volatile random access memory (NVRAM) located on the circuit medium, to receive data representing the write request from the system memory during a local DMA operation and to store the data representing the write request as part of a log of write requests received by the network storage server, and a cluster interconnect adapter located on the circuit medium, through which to send data representing the write request to a cluster partner during a remote DMA operation, wherein the cluster interconnect adapter includes:

control circuitry to control access to the NVRAM and to control communication with the cluster partner, the control circuitry including a host channel adapter;

a first connector coupled to the control circuitry, to couple the cluster interconnect adapter to an external communication link for communication with the cluster partner; and a second connector coupled to the control circuitry, to couple the cluster interconnect adapter to an internal expansion bus of the host device, through which to receive the data representing the write request; and an instruction memory storing a single software stack including instructions which when executed by the processor cause the processor to operate the NVRAM and the cluster interconnect adapter, wherein the network storage server is operable to store data in the NVRAM during a local direct memory access (DMA) operation executed in the network storage server, and is further operable to store the data in a memory of the cluster partner via the cluster interconnect adapter during a remote DMA executed from the network storage server and wherein the local DMA operation and the remote DMA operation are performed in response to a single transaction on the expansion bus, wherein the local DMA operation and the remote DMA operation each include sending data in an InfiniBand message, and wherein the local DMA operation further includes using a loopback queue pair.

20. A network storage server as recited in claim 19 wherein the circuit medium is a circuit card.

21. A network storage server as recited in claim 19, wherein the cluster interconnect adapter comprises an InfiniBand host channel adapter.

22. A network storage server as recited in claim 19, wherein the network storage server comprises a filer.

* * * * *